(12) United States Patent
Sayama et al.

(10) Patent No.: US 6,397,809 B1
(45) Date of Patent: Jun. 4, 2002

(54) BALANCING DEVICE FOR A FOUR-CYCLE ENGINE

(75) Inventors: Takehiko Sayama; Naoki Takahara; Shinichi Murakami; Yasuhiro Yamasaki, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/524,406

(22) Filed: Mar. 13, 2000

(30) Foreign Application Priority Data

Mar. 12, 1999 (JP) ............................. 11-067133

(51) Int. Cl.⁷ .............................................. F16F 15/26
(52) U.S. Cl. ................................................. 123/192.2
(58) Field of Search .......................... 123/192.2, 192.1; 74/603, 604

(56) References Cited

U.S. PATENT DOCUMENTS 5,131,355 A * 7/1992 Bukovics et al. ......... 123/192.2

FOREIGN PATENT DOCUMENTS

DE 3625346 A1 * 2/1988 ................. 74/604

* cited by examiner

Primary Examiner—Marguerite McMahon
Assistant Examiner—Hyder Ali
(74) Attorney, Agent, or Firm—Armstrong, Westerman & Hattori, LLP (57) ABSTRACT

There is provided a balancing device for a four-cycle V-type eight-cylinder engine having a bank gap angle of 90 degrees, characterized by provision on a common rotating shaft (balance shafts $8_1$, $8_2$ as described in the mode for carrying out the invention) a part (an equivalent inertia mass P in the mode for carrying out the invention) for generating a first inertia force for offsetting a residual secondary inertia force from piston systems and a part (equivalent inertia masses VH, VV as described in the mode for carrying out the invention) for generating a second inertia force for offsetting a residual inertia force from valve systems. According to this construction, since balancing devices for piston and valve systems can be integrated into one unit, there is involved no complexity in construction.

16 Claims, 11 Drawing Sheets

BALANCING DEVICE FOR A FOUR-CYCLE ENGINE

BACKGROUND OF THE INVENTION

1. Field of the Invention

The present invention relates to a balancing device for a four-cycle engine and, more particularly, relates to a balancing device for canceling out a vibromotive force generated from a four-cycle V-type eight-cylinder engine having a bank gap of 90 degrees.

2. Description of the Related Art

When a plane crank configuration is adopted in a four-cycle V-type eight-cylinder engine having a bank gap of 90 degrees in which axial centers of all crank pins are disposed on the same plane, the operation cycle of the two banks occurs at every 180 degrees of crankshaft rotation, and intake and exhaust operations take place alternately. According to this construction, because the intake and exhaust operations happen at equal intervals, no exhaust interference is caused, and thus, the engine so constructed is advantageous in obtaining a high output.

On the other hand, in the V-type eight-cylinder engine using the plane crank configuration, in a case where a plane is disposed perpendicularly which passes through the center of a crankshaft so as to bisect the bank gap angle of the engine, unbalanced forces produced by a horizontal component of an inertia force generated by reciprocating pistons in the two banks of the engine cannot be cancelled out only by counterweights provided on the crankshaft. This unbalance, however, is identical to unbalanced forces produced by a secondary inertia force generated in a condition in which the cylinders of an in-line four-cylinder engine are made horizontal, and therefore, it can be cancelled out by rotating two balance shafts disposed on a perpendicular plane in opposite directions to each other by adopting the theory of the secondary balancer for a conventional in-line four-cylinder engine (refer to Japanese Patent Unexamined Publication No. Hei. 8-193643).

With the aforesaid conventional balancing device, however, in which consideration is given only to the balancing of the inertia force from the piston system, unbalanced vibrations cannot be eliminated which are caused by the inertia force from the valve system. In particular, in the case of a V-type engine in which a closed valve resting mechanism is provided for a valve system on one of the banks thereof, the inertia forces of the valve systems on the two banks become different, and this makes it more difficult to eliminate unbalanced vibrations caused by the inertia forces from the valve systems.

As is disclosed in Japanese Utility Model Unexamined Publication No. Sho.64-36630, a balancing device is also known in which equivalent inertia masses are provided for the valve systems. This balancing device is, however, provided separately from a balancing device for the piston systems, and therefore, it is inevitable that the construction of the engine becomes complicated.

SUMMARY OF THE INVENTION

The present invention has been made with a view to solving the problem inherent in the prior art, and an object thereof is to provide a balancing device for a four-cycle engine which can control vibrations of the engine at a further improved level without involving any complexity in construction of the engine.

With a view to attaining the above object, according to a first aspect of the present invention, there is provided a balancing device for a four-cycle V-type eight-cylinder engine having a bank gap angle of 90 degrees, in which there is provided, on a common rotating shaft, a part (an equivalent inertia mass P as described in a mode for carrying out the invention) for generating a first inertia force for offsetting a residual secondary inertia force from piston systems and a part (equivalent inertia masses $V_H$, $V_V$ as described in the mode for carrying out the invention) for generating a second inertia force for canceling out a residual inertia force from valve systems. According to this construction, since balancing devices for the piston and valve systems can be integrated into one device, no complicated construction can be involved.

In particular, in a case where an engine has asymmetrically constructed valve systems on the two banks thereof, with a construction in which weights (eccentric weights $9_1$, $9_2$ as described in the mode for carrying out the invention) each having a center of gravity positioned in a direction of a vector sum of first and second inertia forces are provided on the rotating shaft, the configuration of the rotating shaft does not have to be complicated. In addition, with a construction in which the rotating shaft has parts (third weights $40_1$, $40_2$ as described in the mode for carrying out the invention) provided on a most extreme end thereof for generating a third inertia force for offsetting a residual secondary inertia couple from the valve systems, it is possible to attain the control of vibrations of the engine at a further improved level.

In addition to this, the above-mentioned object can be achieved by a balancing device for a four-cycle engine according to a second aspect of the present invention comprising:

a common rotating member rotatable in accordance with the rotation of a crankshaft of the engine, the common rotating member including:
   a first portion for generating a first inertia force which offsets a residual secondary inertia force caused by piston systems when the engine is driven, and
   a second portion for generating a second inertia force which offsets a residual secondary inertia force from valve systems when the engine is driven.

In the above-mentioned construction, it is preferable that the rotating member further comprises:
   a third portion, which is disposed at its end portion, for generating a third inertia force which offsets a residual secondary inertia couple being caused by valve systems.

In the above-mentioned construction, it is preferable that the four-cycle engine is a four-cycle V-type engine, the valve systems are constituted by first and second valve systems which are asymmetrically constructed each other, the first valve system is disposed in one of the banks, and the second valve system is disposed in the other of the banks.

In the above-mentioned construction, it is also preferable that the rotating member is provided with at least one weight having a gravity of center positioned in a direction of a vector sum of vectors of the first inertia force and the second inertia force.

Further, in the above-mentioned construction, it is also preferable that the rotating member is provided with a third portion, which is disposed at its end portion, for generating a third inertia force which offsets a residual secondary inertia couple being caused by the first and second valve systems.

Further, in the above-mentioned construction, it is preferable that the first valve system disposed in one of the banks comprises a valve resting mechanism for maintaining intake and exhaust valves of the valve systems in a valve closed state. It is also preferable that the first valve system disposed on the one of the banks comprises a valve resting mechanism for creating a vacuum state within a combustion chamber by resting the operation of the valves when the piston is at a top dead center.

In the above-mentioned balancing device for a four-cycle engine, it is preferable that the rotating member is supported on crank bearing walls of the engine.

In the above-mentioned balancing device, the four-cycle engine is a four-cycle V-type eight-cylinder engine having a bank gap angle of 90 degrees, wherein the common rotating member comprises:

a first common rotating shaft rotated in a first direction in accordance with the rotation of the crank shaft and provided with a first weight member for generating a part of the first inertia force and a part of the second inertia force; and a second common rotating shaft rotated in a second direction opposite to the first common rotating shaft with a second weight member for generating the remaining part of the first inertia force and the remaining part of the second inertia force.

In the balancing device, the valve systems may be constituted by first and second valve systems which are asymmetrically constructed in relation to each other, in which the first valve system is disposed in one of the banks and the second valve system is disposed in the other of the banks.

In the balancing device, each of the first and second weight members may have a center of gravity positioned in a direction of a vector sum of vectors of the first inertia force and the second inertia force.

In the balancing device, the first rotating shaft is provided with a third weight member at its end portion for generating a part of a third inertia force which offsets a residual secondary inertia couple being caused by the valve systems, and the second rotating shaft is provided with a fourth weight member at its end portion for generating the remaining part of the third inertia force.

Further, in the balancing device the first rotating shaft may be provided with a third weight member at its end portion for generating a part of a third inertia force which offsets a residual secondary inertia couple being caused by the valve systems, and the second rotating shaft is provided with a fourth weight member at its end portion for generating the remaining part of the third inertia force.

In the balancing device, the first valve system may comprise:

a valve resting mechanism for maintaining intake and exhaust valves of the valve systems in a valve closed state.

Further, in the balancing device, the first valve system preferably comprises a valve resting mechanism for creating a vacuum state within a combustion chamber by resting the operation of the valves when the piston is at top dead center.

Furthermore, in the balancing device the first and second rotating shafts are supported on crank bearing walls.

DETAILED DESCRIPTION OF THE PREFERRED EMBODIMENTS

Referring to the accompanying drawings, the construction of the present invention will be described in detail below.

Figure 1:
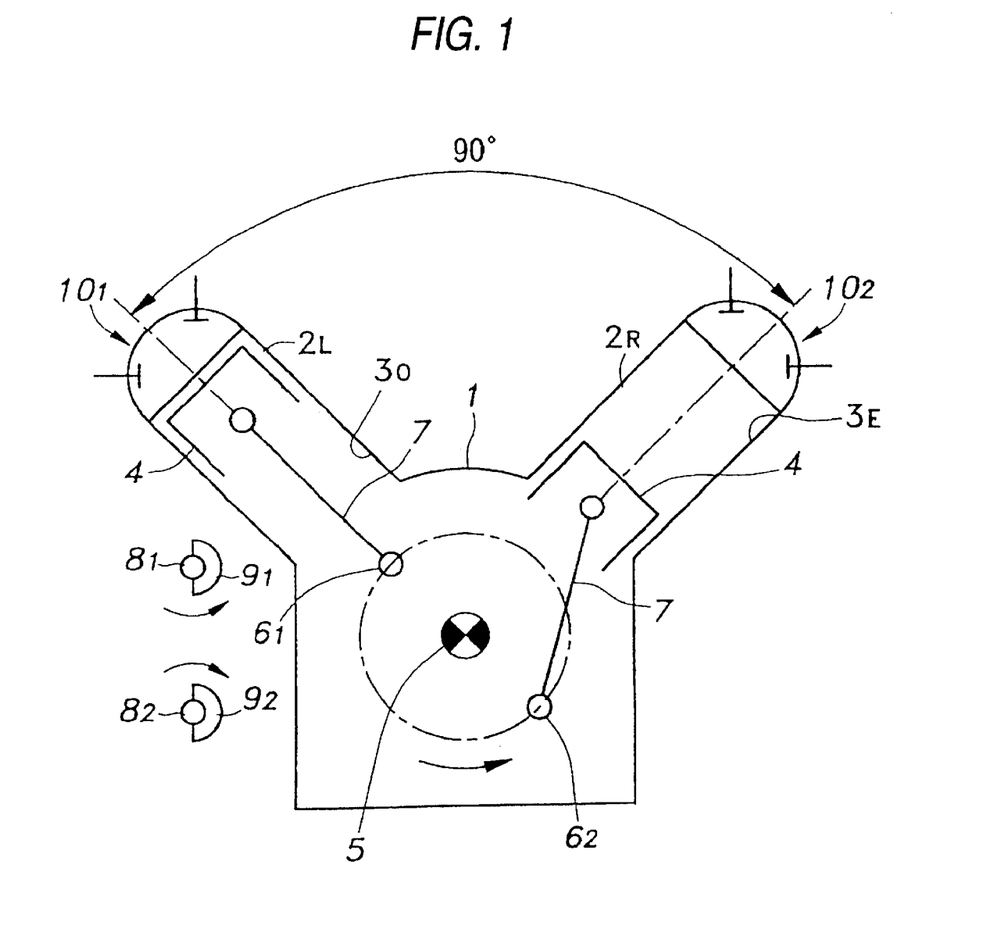
FIG. 1 is a typical view of a V-type engine to which the present invention is applied.

FIG. 1 is a typical view of a four-cycle V-type eight-cylinder engine to which the present invention is applied. A cylinder block 1 of the engine has a pair of banks 2L, 2R disposed at a 90-degree angle so as to form a V-shape, each having four cylinders, and in the figure, cylinders $3_O$ of odd numbers are disposed in the left-hand side bank 2L, cylinders $3_E$ of even numbers are disposed in the right-hand side bank 2R. Pistons 4 slidingly fitted in the respective cylinders in the both banks 2L, 2R are connected via connecting rods 7, respectively, to crank pins 61, 62 disposed on a crankshaft 5 supported at an intersection point of centers of the two banks in such a manner as to be displaced at 180 degrees about the center of the crankshaft 5. To be more specific, this crank shaft 5 is a so-called plane crank, and the crank pins 61 to which a pair of pistons in the first and second cylinders and a pair of pistons in the seventh and eighth cylinders are connected, respectively, are oriented in the same direction, while the crank pins 62 to which a pair of pistons in the third and fourth cylinders and a pair of pistons in the fifth and sixth cylinders are connected, respectively, are oriented in the same direction, each pair being displaced in such a manner as to be displaced at 180 degrees about the center of the crankshaft 5.

With the crank pin arrangement described above, unbalanced vibrations are caused mainly by a residual secondary inertia force, and therefore, in order to eliminate these vibrations, there are provided two balance shafts $8_1$, $8_2$ which are parallel to the crank shaft 5.

The two balance shafts $8_1$, $8_2$ are provided to one side of the crank shaft 5 at positions equally distant, respectively, upwardly and downwardly from a plane passing through the center of the crank shaft 5 in such a manner as to extend in a longitudinal direction of the crankshaft 5 and they have eccentric weights $9_1$, $9_2$ having centers of gravity deviated in predetermined directions from the rotational centers thereof. These balance shafts $8_1$, $8_2$ are interlockingly connected to the crankshaft 5 via a belt or chain transmission mechanism or a gear transmission mechanism, which is not shown, in such a manner that the upper balance shaft $8_1$ is rotated at twice the crankshaft rotational speed in the same direction as the rotational direction of the crankshaft 5, while the lower balance shaft $8_2$ is rotated at twice the crankshaft rotational speed in a direction opposite to the rotational direction of the crankshaft 5.

Valve systems $10_1$, $10_2$ each comprising a pair of intake valves and a pair of exhaust valves are provided for the respective cylinders in the respective cylinder heads. The valve systems $10_1$, $10_2$ will be described in detail below. The basic constructions of the intake valve and the exhaust valve are identical.

Figure 2:
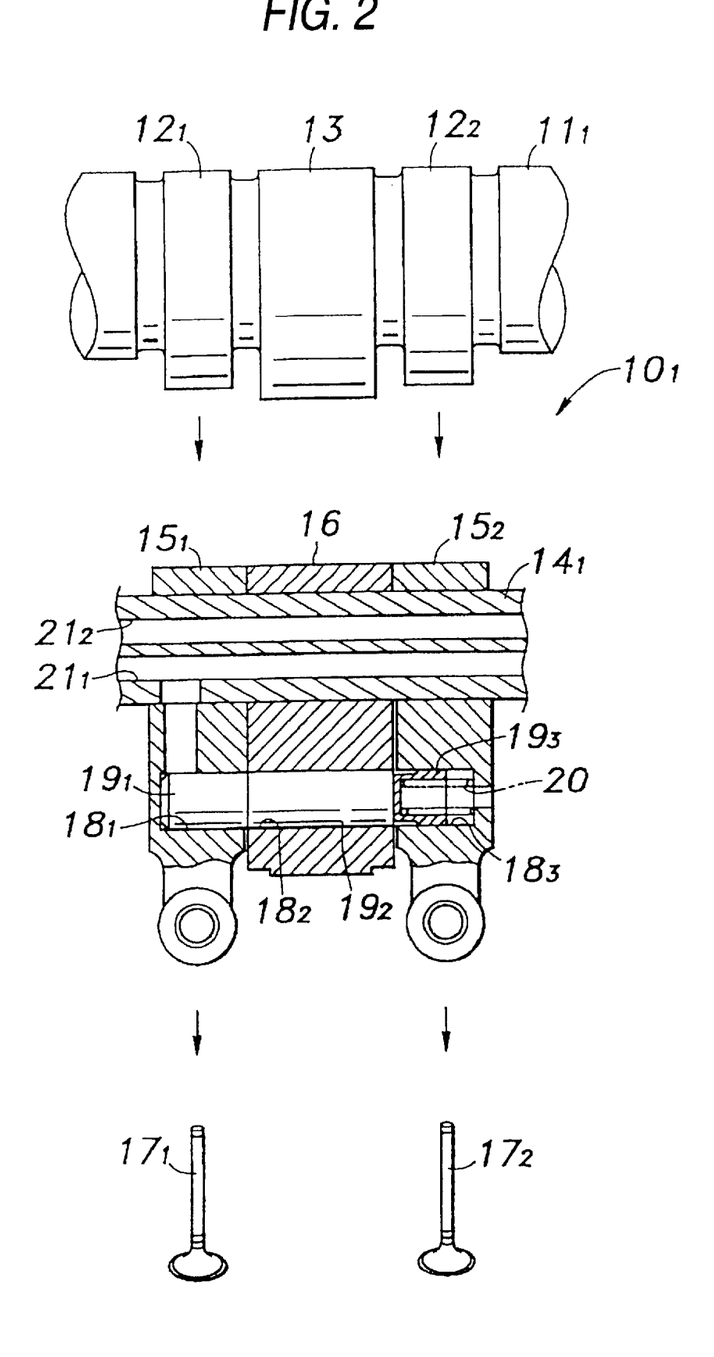
FIG. 2 is a typical view showing a low-speed mode state of a 2-mode variable valve device.

FIG. 2 is a schematic view showing the construction of the valve system $10_1$ provided on the bank 2L of the two banks. As shown in FIG. 2, integrally formed on a camshaft $11_1$ are two low-speed cams $12_1$, $12_2$ each having a small operating angle and a small lift amount and a high-speed cam 13 held between these cams $12_1$, $12_2$ and having a large operating angle and a large lift amount. Three rocker arms $15_1$, $15_2$, 16 are pivotally supported at adjacent positions to each other on a rocker-arm shaft $14_1$ which is parallel to the camshaft $11_1$ in such a manner that the rocker arms freely rock and are displaced at relative angles. These rocker arms $15_1$, $15_2$, 16 are driven to rock by the cams $12_1$, $12_2$, 13 confronting thereto.

The first and second rocker arms $15_1$, $15_2$ driven by the low-speed cams $12_1$, $12_2$, basically have identical configurations, and brought into abutment with free ends of the respective rocker arms $15_1$, $15_2$ are ends of stems of two valves $17_1$, $17_2$ normally spring biassed in a valve closing direction. In addition, the sliding contact state of the third rocker arm 16 driven by the high-speed cam 13 with the high-speed cam 13 is maintained all the time by a spring means, not shown.

Provided in the interior of the first to third rocker arms $15_1$, $15_2$, 16 disposed adjacent to each other is a coupling switching device for performing switching between a state in which the rocker arms are displaced from each other at relative angles or a low-speed mode and a state in which the rocker arms are rocked together or a high-speed mode, and the coupling switching device will be described in detail below.

A first bottomed guide hole $18_1$ is formed in the first rocker arm 15, positioned leftward in FIG. 2 in such a manner as to be in parallel with the axis of the rocker-arm shaft $14_1$ and to open to the third rocker arm 16 which is centrally positioned, and a first switching pin $19_1$ is slidingly fitted in the bottomed guide hole $18_1$. A second guide hole $18_2$ is formed through the third rocker arm 16 such that the second guide hole $18_2$ becomes concentric with the first guide hole $18_1$ at a stationary position where a base circular portion of the high-speed cam 13 is brought into sliding contact with a cam slipper, and slidingly fitted in the second guide hole $18_2$ is a second switching pin $19_2$, which is brought into abutment with the first switching pin $19_1$ at one end thereof. A third guide hole $18_3$, which is substantially bottomed as with the first rocker arm $15_1$, is formed in the second rocker arm $15_2$ which is disposed rightward in FIG. 2, and slidingly fitted in the third guide hole $18_3$ is a stopper pin $19_3$ which is brought into abutment with the other end of the second switching pin $19_2$ at one end thereof. The stopper pin is normally spring biased toward the second rocker arm 16 by means of a compression coil spring 20.

Two oil supply passages $21_1$, $21_2$ are formed inside the rocker-arm shaft $14_1$ for supplying a lubricating oil pumped up from an oil pan. The oil supply passage $21_1$ of the two passages is caused to communicate with a bottom portion of the first guide hole $18_1$, while the other oil supply passage $21_2$ is caused to communicate with a passage (not shown) for supplying the lubricating oil between the rocker-arm shaft $14_1$ and the respective rocker arms $15_1$, $15_2$, 16, a sliding joint surface between the respective cams $12_1$, $12_2$, 13 and the cam slipper and cam journals.

The aforesaid coupling switching device is caused to function by controlling a switching valve adapted to be operated by signals from an electronic control circuit, not shown, in response to the running conditions of the engine so as to open and/or close the valve to thereby allow a hydraulic pressure to intermittently act on the first switching pin $19_1$ in the first guide hole $18_1$ from the oil supply passage $21_1$.

In a low-speed mode, if the hydraulic pressure is kept prevented from acting on the first switching pin $19_1$, the respective pins $19_1$, $19_2$, $19_3$ are located by virtue of the spring-back force of the compression coil spring 20 at positions where the respective pins $19_1$, $19_2$, $19_3$ align with the respective guide holes $18_1$, $18_2$, $18_3$ (refer to FIG. 2). In this state, the respective rocker arms $15_1$, $15_2$, 16 can be displaced from each other at relative angles. Therefore, the rocker arms $15_1$, $15_2$ are not affected by the third rocker arm 16 driven by the high-speed cam 13, and the two valves $17_1$, $17_2$ are simultaneously driven to be opened via the first and second rocker arms $15_1$, $15_2$ adapted to be driven to rock by the profiles of the low-speed cams $12_1$, $12_2$.

Figure 3:
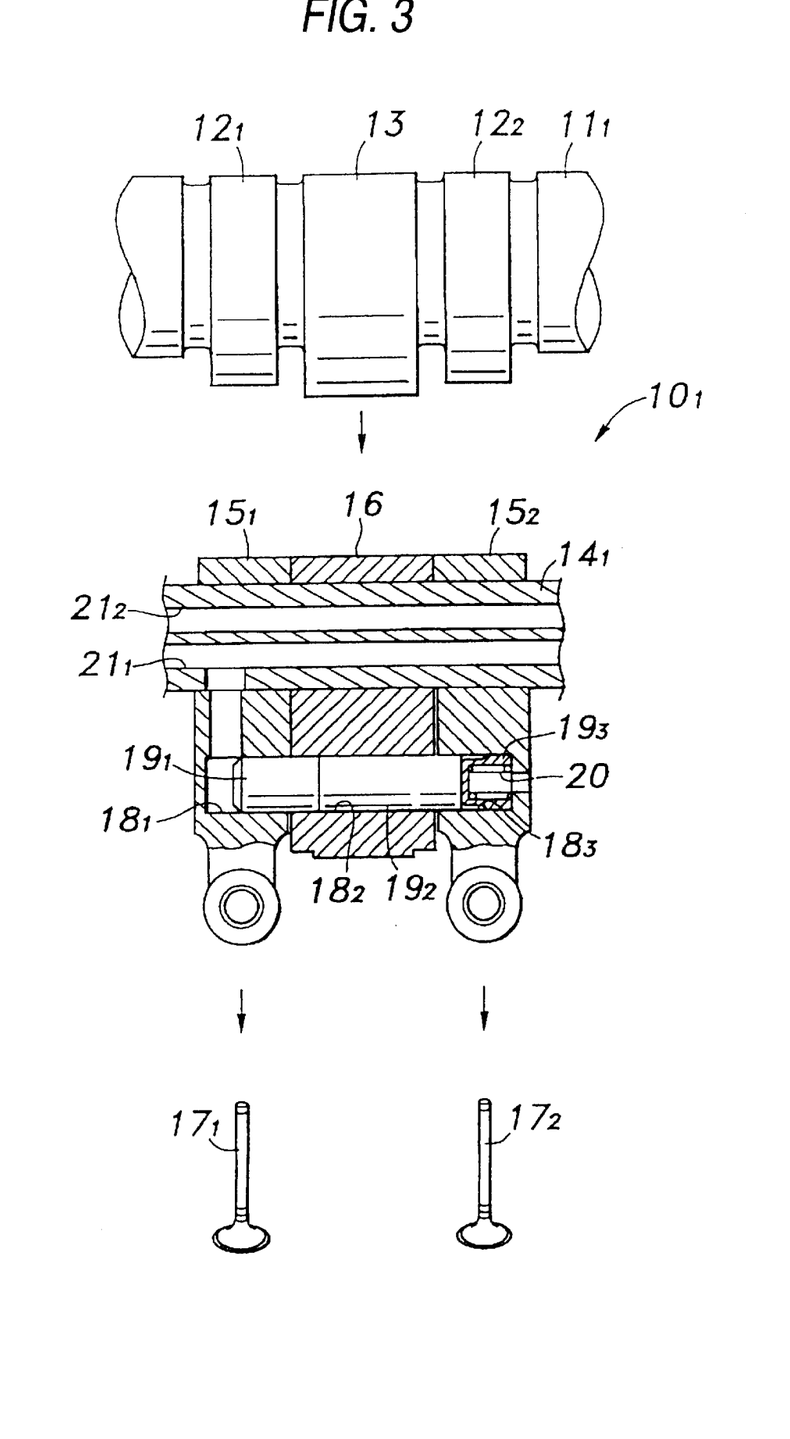
FIG. 3 is a typical view showing a high-speed mode state of the 2-mode variable valve device.

In a high-speed mode, when a hydraulic pressure is caused to act on the first switching pin $19_1$, the second switching pin $19_2$ and the stopper pin $19_3$ are pushed back against the spring-back force of the compression coil spring 20. This puts the respective pins $19_1$, $19_2$, $19_3$ in a state in which they extend between the rocker arms $15_1$, $15_2$, 16 that are arranged adjacent to each other (refer to FIG. 3). Thus, the three rocker arms $15_1$, $15_2$, 16 are coupled to each other so as to rock together, and the two valves $17_1$, $17_2$ are simultaneously driven to be opened by the profile of the high-speed cam 16 positioned centrally.

Figure 4:
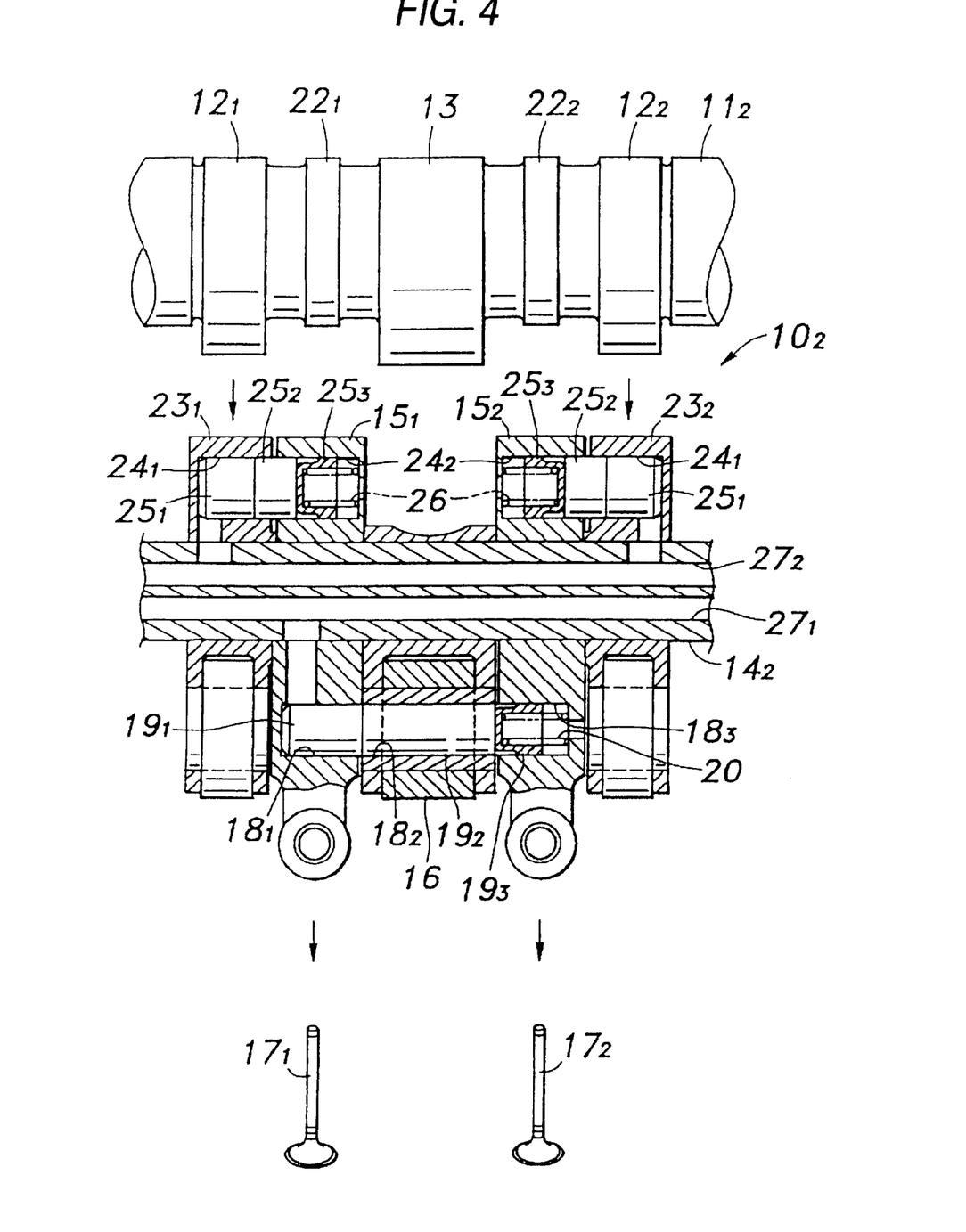
FIG. 4 is a typical view showing a low-speed mode state of a 3-mode variable valve device.

FIG. 4 is a schematic view showing the construction of the valve system $10_2$ provided on the other bank 2R. Integrally formed on a camshaft $11_2$ are a high-speed cam 13 provided centrally and having a large operating angle and a large lift amount, two base circular portions $22_1$, $22_2$ provided to sides of the high-speed cam 13, respectively, and two low-speed cams $12_1$, $12_2$ provided outwardly of the base circular portions $22_1$, $22_2$, respectively and each having a small operating angle and a small lift amount. Pivotally supported on a rocker-arm shaft $14_2$ extending in parallel with the camshaft $11_2$ therebelow are three rocker arms $15_1$, $15_2$, 16 that are similar to those provided in the bank 2L, and two rocker arms $23_1$, $23_2$ provided so as to hold those three rocker arms therebetween in such a manner that those rocker arms are positioned adjacent to each other and that they can freely be rocked and displaced from each other at relative angles. Then, the respective rocker arms $15_1$, $15_2$, 16 $23_1$, $23_2$ are in sliding contact with the corresponding cams $12_1$, $12_2$, 13 and the base circular portions $22_1$, $22_2$, respectively.

Because the relationship between the three rocker arms $15_1$, $15_2$, 16 and the two valves $17_1$, $17_2$ provided in the other bank 2R is substantially the same as that of the valve systems $11_1$ provided in the bank 2L, like reference numerals are given to like components and the description thereof will be omitted here. Thus, only portions will be described below which are different from the valve system $11_1$ on the bank 2L.

The fourth and fifth rocker arms $23_1$, $23_2$ that are arranged adjacent, respectively, to the first and second rocker arms $15_1$, $15_2$ corresponding, respectively, to the base circular portions $22_1$, $22_2$ on the camshaft $11_2$ correspond to the low-speed cams $12_1$, $12_2$, respectively. A coupling switching device similar to that provided in the first to third rocker arms $15_1$, $15_2$, 16 is provided, respectively, in pairs of first and fourth rocker arms $15_1$, $23_1$ and third and fifth rocker arms $15_2$, $23_2$ for performing switching between a state in which the cams are displaced from each other at relative angles or a valve resting mode and a state in which the cams are caused to rock together or a low-speed mode. The switching device provided in the first and fourth rocker arms $15_1$, $23_1$ is identical to that provided in the third and fifth rocker arms $15_2$, $23_2$ in construction and operation despite the fact that they are symmetrical.

Fourth and fifth bottomed guide holes $24_1$, $24_2$ are formed in parallel with the axis of the rocker-arm shaft $14_2$ in the fourth and fifth rocker arms $23_1$, $23_2$ which are in sliding contact with the low-speed cams $12_1$, $12_2$, respectively, and the first and second rocker arms $15_1$, $15_2$ which are in abutment with ends of the stems of the valves $17_1$, $17_2$, respectively, in such a manner that the bottomed guide holes $24_1$, $24_2$ become concentric and are caused to communicate with each other when the rocker arms are located at a stationary position where they are both brought into sliding contact with the base circular portions. Slidingly fitted in each of these guide holes $24_1$, $24_2$ are a driving pin $25_1$, a connecting pin $25_2$ and a stopper pin $25_3$.

These three pins $25_1$, $25_2$, $25_3$ are spring biased all the time toward the fourth and fifth rocker arms $23_1$, $23_2$, respectively, by means of compression springs 26 provided between the bottoms of the guide holes $24_2$ and the stopper pins $25_3$, respectively.

Three oil supply passages $27_1$, $27_2$ are formed in the rocker-arm shaft $14_2$ (in the figure, only two of them are shown). One of them, which is the passage $27_1$, is caused to communicate with a bottom portion of a first guide hole $18_1$ and the other passage $27_2$ is caused to communicate with bottom portions of the respective fourth guide holes $24_1$ of the fourth and fifth rocker arms $23_1$, $23_2$.

As with the valve system $10_1$ of the bank 2L, a third oil supply passage is caused to communicate with a passage (not shown) for supplying lubricating oil to between the rocker-arm shaft $14_2$ and the respective rocker arms $15_1$, $15_2$, 16, $23_1$, $23_2$, the sliding contact surface between the respective cams $12_1$, $12_2$, 13 and cam slippers, and cam journals.

In a low-speed mode, when a hydraulic pressure is prevented from acting on the bottom portions of all the guide holes $18_1$, $24_2$, the respective connecting pins $25_2$ are caused to extend between the first and fourth rocker arms $15_1$, $23_2$ and the second and fifth rocker arms $15_2$, $23_2$, respectively, by virtue of spring forces of the respective compression coil springs 20, 26, whereby the first and fourth rocker arms 151, 232 and the second and fifth rocker arms $15_2$, $23_2$ are coupled to each other, respectively, each pair being thereby caused to rock together. When this happens, the coupling between the first to third rocker arms $15_1$, $15_2$, 16 is made ineffective. Therefore, rockingly driving forces generated by the profiles of the low-speed cams $12_1$, $12_2$ and imparted to the fourth and fifth rocker arms $23_1$, $23_2$ are transmitted to the first and second rocker arms $15_1$, $15_2$, whereby the two valves $17_1$, $17_2$ are driven to be opened, while following the profiles of the low-speed cams $12_1$, $12_2$ (refer to FIG. 4).

Figure 5:
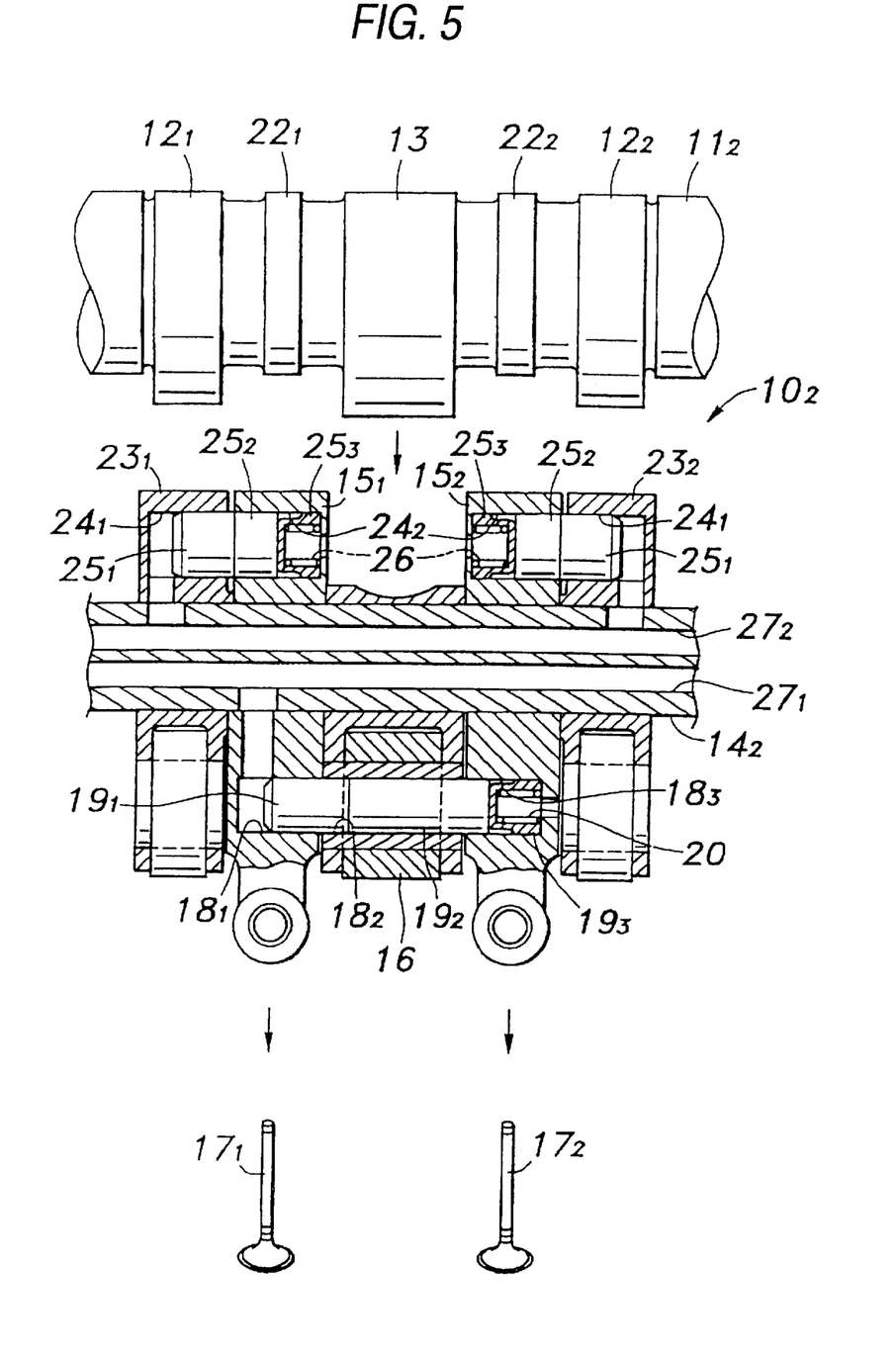
FIG. 5 is a typical view showing a high-speed mode state of the 3-mode variable valve device.

In a high-speed mode, when a hydraulic pressure is allowed to be applied to the first switching pin $19_1$, the respective pins $19_1$, $19_2$, $19_3$ are put in a state in which they extend between the adjacent rocker arms $15_1$, $15_2$, 16, whereby the three rocker arms are coupled to each other, the rocker arms being thereby allowed to rock together. This allows the two valves $17_1$, $17_2$ to be driven simultaneously by the high-speed cam 13 irrespective of the coupling state between the first and fourth rocker arms $15_1$, $23_1$ and the second and fifth rocker arms $15_2$, $23_2$, respectively. (refer to FIG. 5).

In a valve resting mode, when a hydraulic pressure is allowed to be applied to the respective driving pins $25_1$ in the fourth and fifth rocker arms $23_1$, $23_2$, the respective driving pins $25_2$ are moved into the first and second rocker arms $15_1$, $15_2$ against the spring-back forces of the compression coil springs 26, whereby the first and fourth rocker arms $15_1$, $23_1$ and the second and fifth rocker arms $15_2$, $23_2$ are disconnected from each other, respectively. This prevents the transmission of the rocking movement of the fourth and fifth rocker arms $23_1$, $23_2$ by the low-speed cams $12_1$, $12_2$ to the first and second rocker arms $15_1$, $15_2$. Simultaneously with this, when the hydraulic pressure is kept prevented from being applied to the first switching pin $19_1$, the first to the third rocker arms $15_1$, $15_2$, 16 are also disconnected from each other, whereby the rocking movement of the third rocker arm 16 by the high-speed cam is not transmitted to the first and second rocker arms $15_1$, $15_2$, either. Therefore, the first and second rocker arms $15_1$, $15_2$ are brought into sliding contact with the base circular portions $22_1$, $22_2$ of the camshaft $11_2$ so as to be put in a stationary state, a closed state of the two valves $17_1$, $17_2$ being thereby maintained (refer to FIG. 6).

Figure 6:
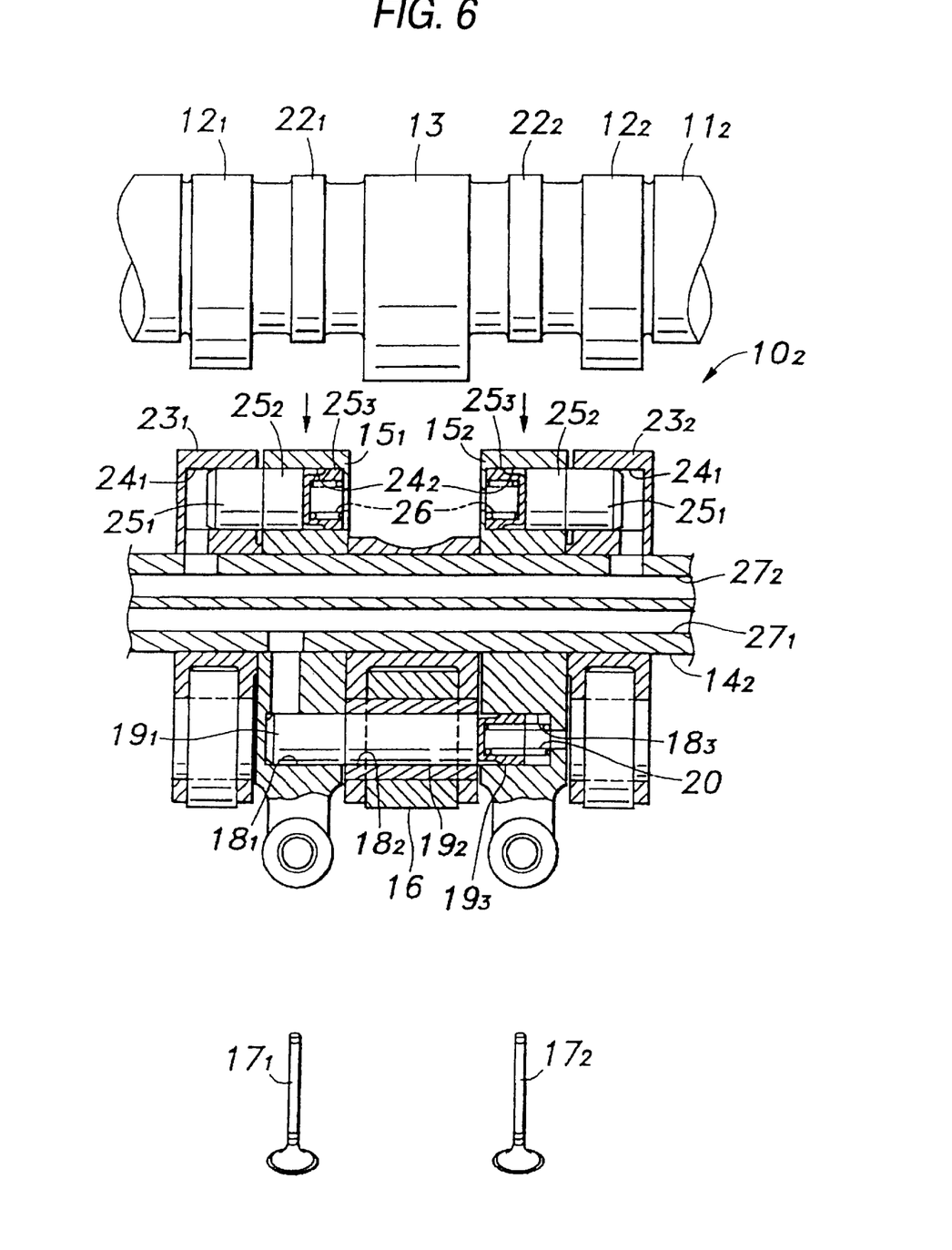
FIG. 6 is a typical view showing a valve resting mode state of the 3-mode variable valve device.

With all the pistons 4 in the other bank 2R being located at a top dead center or TDC, when the valves are rested at their closed positions, a vacuum state is provided in the combustion chambers in the same bank 2R, and therefore, no compression load is applied, and the intake load becomes atmospheric pressure, whereby load generated by the follower movement of the pistons 4 in the other bank 2 can be minimized.

The pins $25_1$, $25_2$, $25_3$ are constructed so as to be divided into three parts with a view to putting all the stopper pins $19_3$, $25_3$ for common use, but the connecting pin $25_2$ and the stopper pin $25_3$ may be made integral in terms of function.

Figure 7:
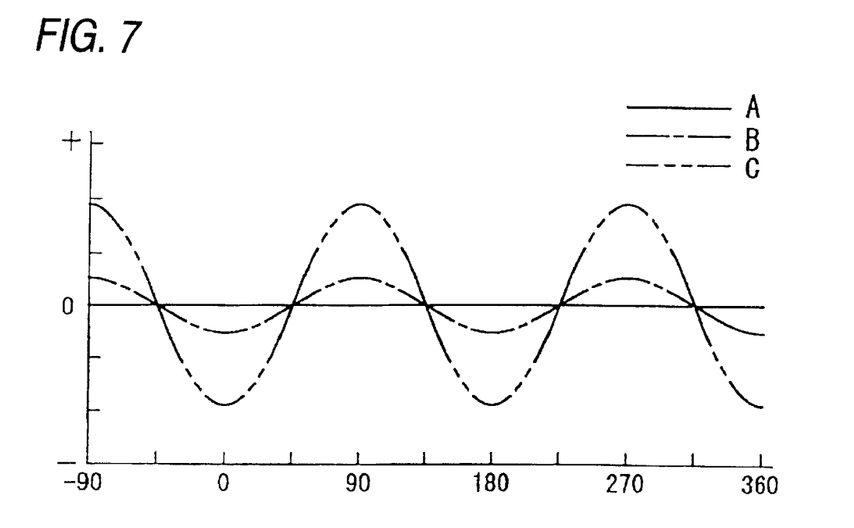
FIG. 7 is a vibration diagram of an engine in which valve systems on the left and right banks thereof are identical.
Figure 8:
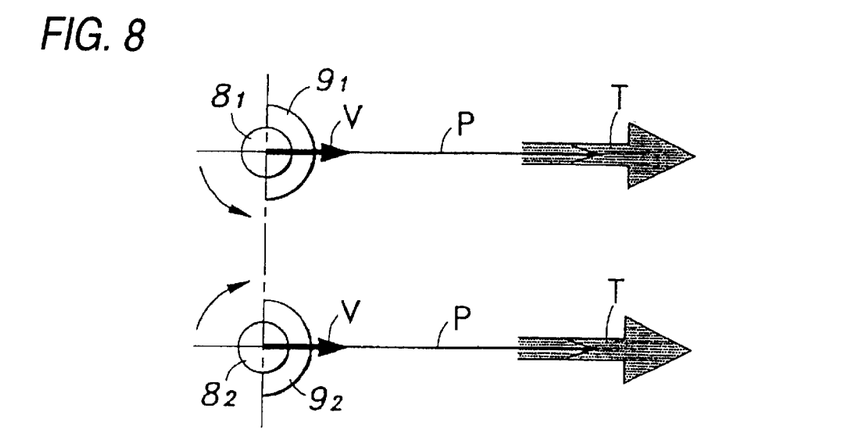
FIG. 8 is a typical view showing magnitudes and directions of equivalent inertia forces of balance shafts for balancing an unbalanced state generated in the engine in which the valve systems on the left and right banks thereof are identical.

As shown in FIG. 7, in a case where the inertia mass of the valve system is identical over the left and right banks 2L, 2R, phases of horizontal components (line B in FIG. 7) and perpendicular components (line A in FIG. 7) of unbalanced vibrations generated by the residual secondary inertia force of the piston system (pistons 4 and connecting rods 7) and unbalanced vibrations generated by the residual secondary inertia force of the valve system (intake and exhaust valves and rocker arms) are equal to each other. In this case, therefore, vectors of inertia forces adapted to offset the residual secondary inertia forces of both the piston and valve systems may be equal to each other. Thus, in the case of this embodiment, there may be provided a construction in which with the pistons in the left-hand side bank 2L being located at TDC, the centers of gravity of the two eccentric weights $9_1$, $9_2$ are located on a horizontal plane and on the right-hand side of the balance shafts (a state shown in FIG. 1), and in which the vector of an inertia force when this occurs becomes an equivalent inertia mass as shown by an arrow T in FIG. 8 which is a resultant of an equivalent inertia mass (a first inertia mass) of the piston system shown by an arrow P in FIG. 8 and an equivalent inertia mass (a second inertia mass) of the valve system shown by an arrow V in FIG. 8. When the vectors of the two masses are combined as described above, the configuration of the eccentric weights $9_1$, $9_2$ can be maintained uncomplicated, thereby making simple the production of the balance shafts $8_1$, $8_2$. It is needless to say that a weight for the equivalent inertia mass of the piston system and a weight for the equivalent mass of the valve system may be provided in series on the same shaft, the weights having different inertia forces.

Figure 9:
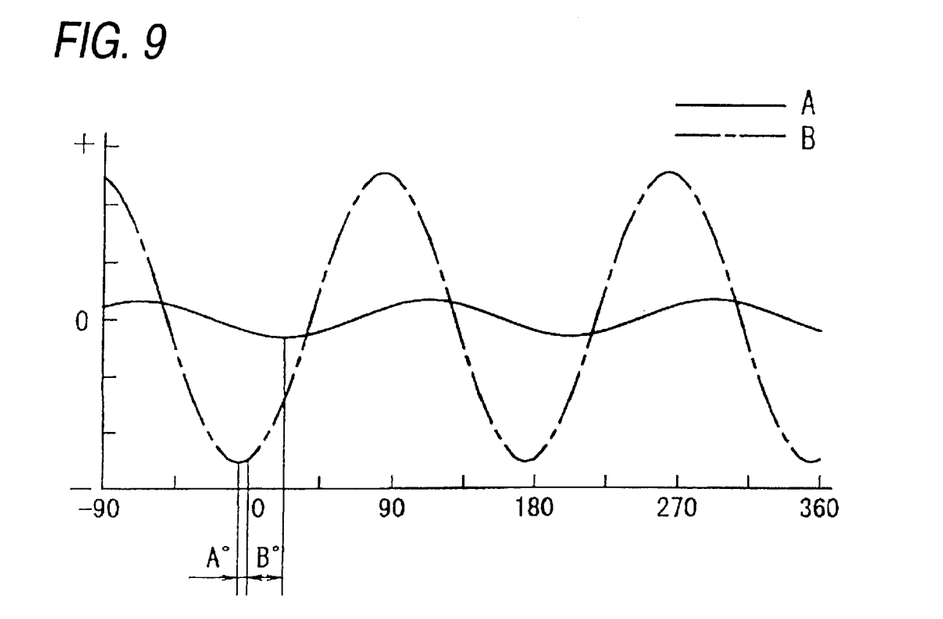
FIG. 9 is a vibration diagram of an engine in which valve systems on the left and right banks thereof are different.
Figure 10:
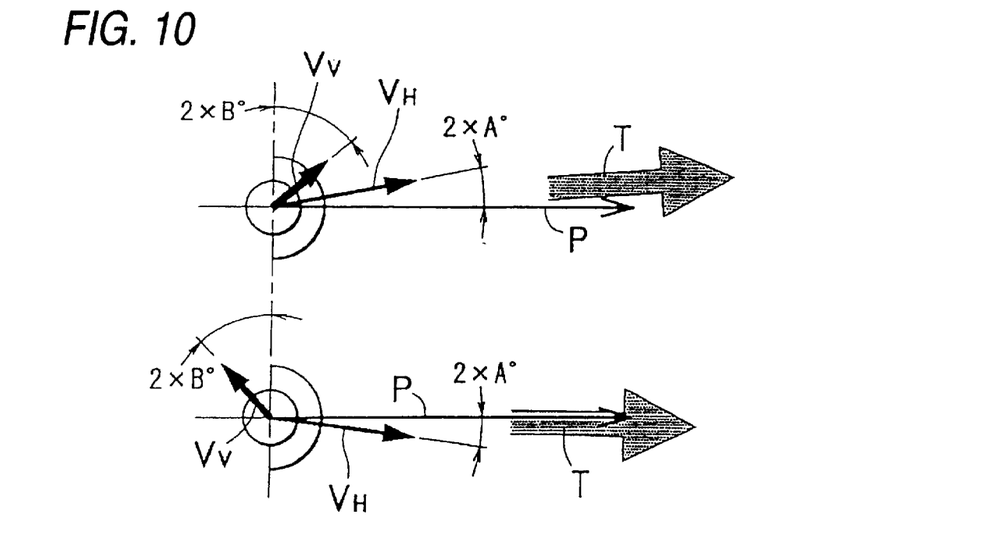
FIG. 10 is a typical view showing magnitudes and directions of equivalent inertia forces of balance shafts for balancing an unbalanced state generated in an engine in which valve systems on the left and right banks thereof are different.

In an engine in which the inertia masses of the valve systems of the left and right banks 2L, 2R are different, in other words, in an engine in which, as described above, the switching device for performing switching between two low speed and high speed modes shown in FIG. 2 is provided on the bank 2L of the two, while the switching device for performing switching between the three low speed, high speed and valve resting modes shown in FIG. 4 is provided on the other bank 2R, when the engine is normally running, as shown in FIG. 9, with the unbalanced vibrations from the piston system being regarded as standard, the horizontal component (line B in FIG. 9) of the unbalanced vibrations from the valve system is advanced by an angle of A degrees, while the perpendicular component (line A in FIG. 9) of also the valve system is delayed by an angle of B degrees. In other words, as shown in FIG. 10, the unbalanced vibrations can be cancelled out by adding equivalent inertia masses for the horizontal component of the valve system in which the vector of the inertia force thereof is deviated by a 2×A degrees (an arrow $V_H$) from the horizontal plane symmetrically therewith relative to the vector (an arrow P) of the equivalent inertia mass of the piston system and equivalent inertia masses for the perpendicular component of the valve system in which the vector of the inertia force thereof is deviated by a 2×B degrees (an arrow $V_V$) from the perpendicular plane symmetrically therewith. As to the added weights having the aforesaid equivalent inertia masses, a single mass (an arrow T in FIG. 10) may be provided in which the vectors of the two equivalent inertia masses are combined so as to become integral. Thus, combining the vectors of the two equivalent inertia masses as described above prevents the configuration of the eccentric weights $9_1$, $9_2$ from becoming complicated, the production of the balance shafts $8_1$, $8_2$ being thereby made easy. It is needless to say that a weight for the equivalent inertia mass of the piston system and a weight for the equivalent inertia mass of the valve system may be provided in series on the same shaft, the weights being different from each other in inertia force and phase.

Figure 11:
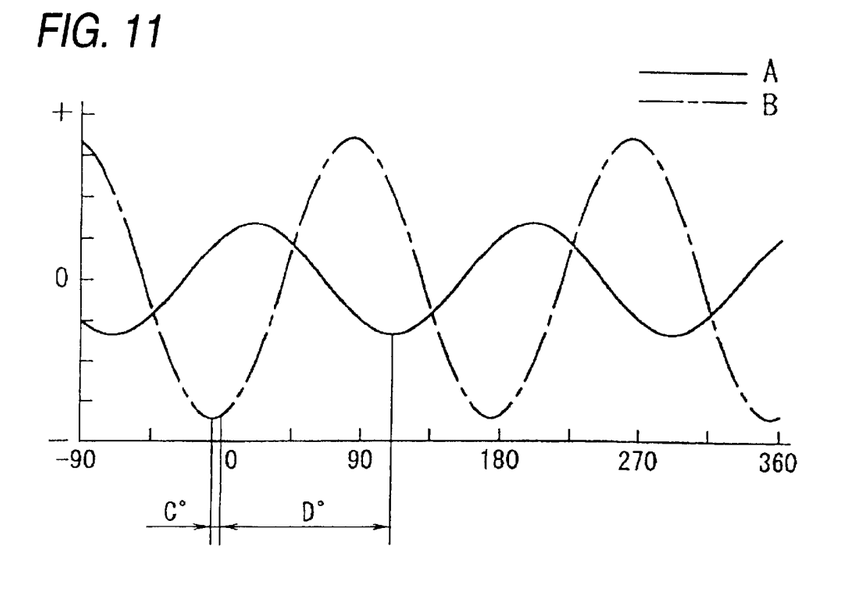
FIG. 11 is a vibration diagram of an engine in which valve systems on the left and right banks thereof are difference and in which one of the banks is in a valve resting state.
Figure 12:
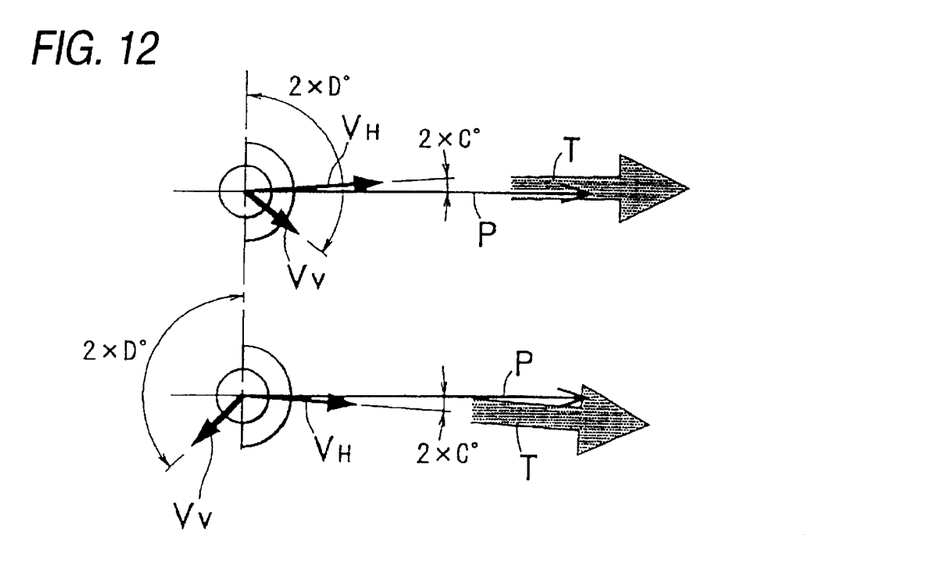
FIG. 12 is a typical view showing magnitudes and directions of equivalent inertia forces of balance shafts for balancing an unbalanced state generated in the engine in which the valve systems on the left and right banks thereof are difference and in which one of the banks is in a valve resting state.

Similarly, in a case where the valve systems on the other bank 2R are put in the closed valve resting mode, because the intake valves and exhaust valves and rocker arms directly coupled to those valves are out of motion, the perpendicular components are not self cancelled, and due to this, as shown in FIG. 11, the phase difference of the perpendicular components becomes large. As with the aforesaid case, in this case, too, in a case where the unbalanced vibrations from the piston system are regarded as standard, the horizontal component (line B in FIG. 11) of the unbalanced vibrations from the valve system is advanced by an angle of C degrees, while the perpendicular component (line A in FIG. 11) of the unbalanced vibrations of the vale system is delayed by an angle of D degrees. In other words, as shown in FIG. 12, the unbalanced vibrations can be cancelled out by adding to the balance shafts $8_1$, $8_2$ equivalent inertia masses for the horizontal component of the valve system in which the vector of the inertia force thereof is deviated by a 2×C degrees (an arrow $V_H$) from the horizontal plane symmetrically therewith relative to the vector (an arrow P) of the equivalent inertia mass of the piston system and equivalent inertia masses for the perpendicular component of the valve system in which the vector of the inertia force thereof is deviated by a 2×D degrees (an arrow $V_V$) from the perpendicular plane symmetrically therewith. As with the above case, as to the added weights, a single mass (an arrow T in FIG. 12) may be provided in which the vectors of the two equivalent inertia masses are combined so as to become integral. Alternately, weights having different inertia forces and phases may be provided in series on the same shaft. Thus, combining the vectors of the two equivalent inertia masses for integration prevents the configuration of the eccentric weights $9_1$, $9_2$ from becoming complicated, the production of the balance shafts $8_1$, $8_2$ being thereby made easy, which is similar to the above case.

Figure 13:
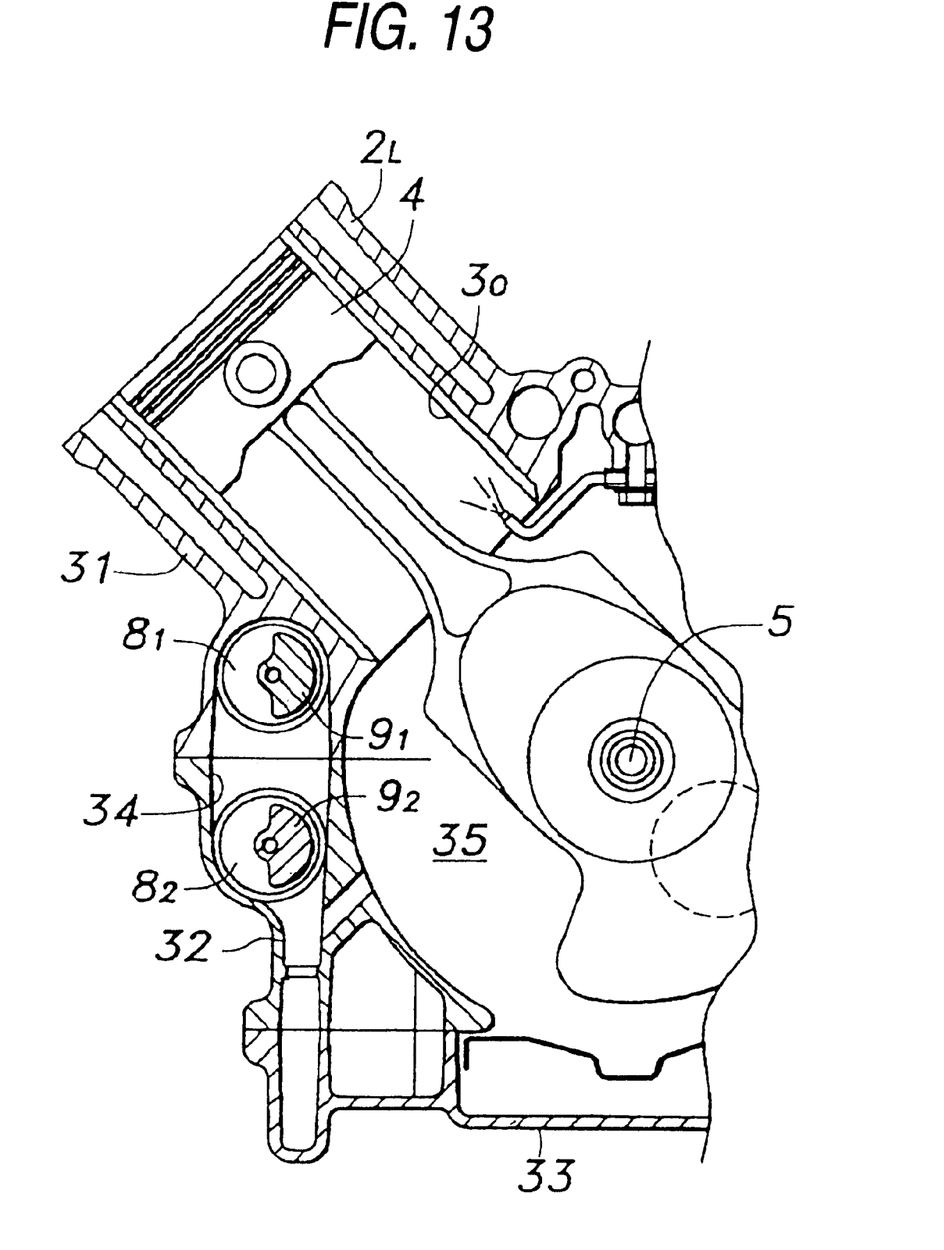
FIG. 13 is a vertical sectional view showing a main part of the engine to which the present invention is applied.
Figure 14:
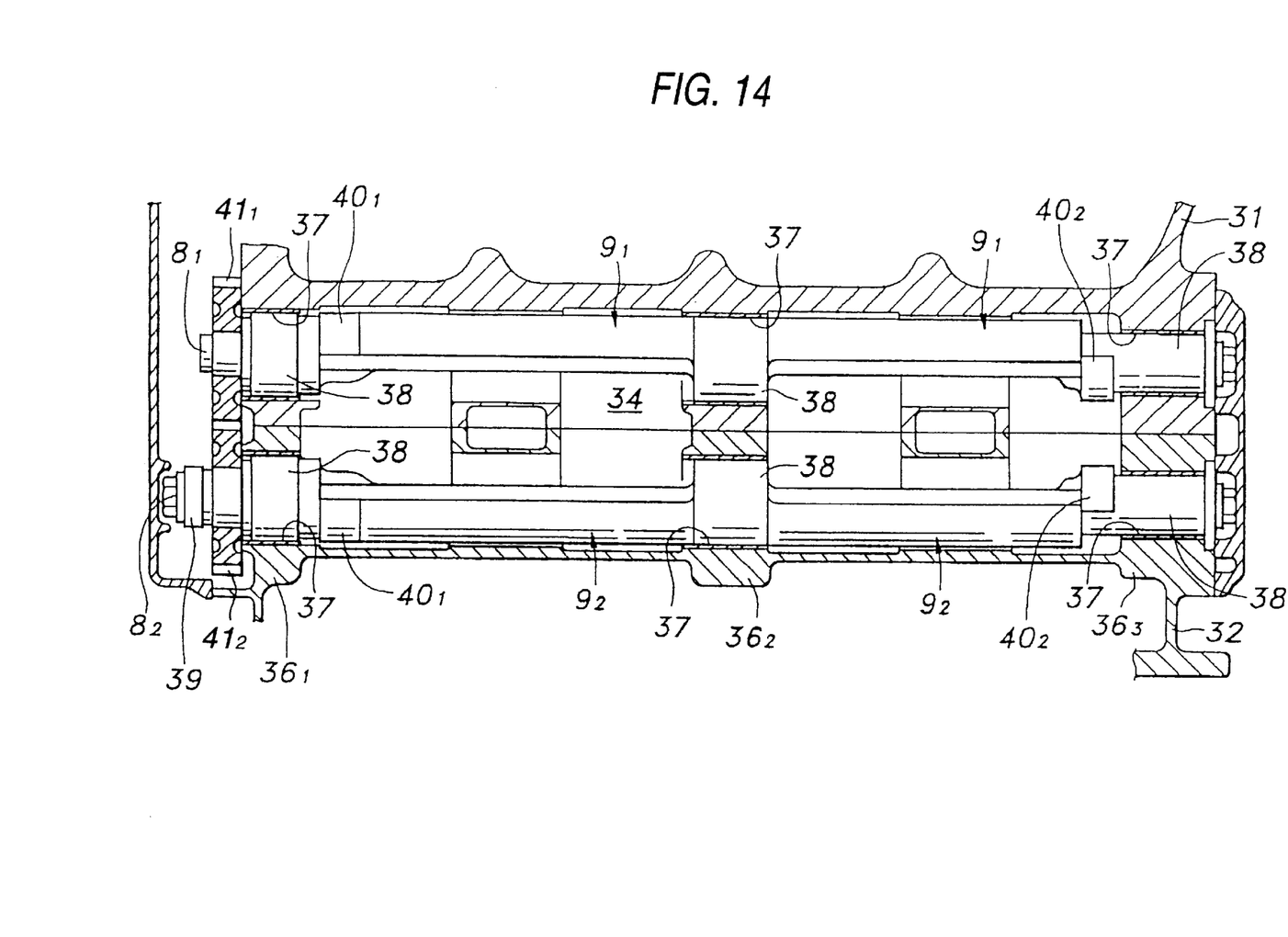
FIG. 14 is a sectional view of the main part taken along a sectional plane passing through the center of the two balance shafts and viewed from the right-hand side of FIG. 13.

As shown in FIGS. 13 and 14, this engine comprises an upper block 31 comprising in turn a pair of cylinder banks 2L, 2R, a lower block 32 joined to a lower surface of the upper block 31 and an oil pan joined to a lower surface of the lower block 32.

The upper block 31 and the lower block 32 are divided from a horizontal plane passing through the center of the crankshaft 5, and an accommodation chamber 34 for accommodating therein the balance shafts $8_1$, $8_2$ is formed in one of side walls in such a manner as to be expanded outwardly of a crank chamber 35. The balance shafts $8_1$, $8_2$ are provided at positions vertically symmetrically with the dividing surface between the upper block 31 and the lower block 32 in such a manner as to extend in parallel with the crankshaft 5.

The upper block 31 and the lower block 32 are constructed such that a continuous wall is formed when they are joined together and that five bearing walls are also formed in which main bearings are formed. As shown in FIG. 14, bearing holes 37 are formed in three bearing walls $36_1$, $36_3$, $36_3$ of the five which are located at ends and middle in the direction of the crankshaft for supporting the respective balance shafts $8_1$, $8_2$. Journal portions 38 provided on the respective balance shafts $8_1$, $8_2$ are fitted in these bearing holes 37.

Because the respective bearing walls where the main bearings are provided are originally highly rigid, in a case where the bearing holes 37 for the balance shafts $8_1$, $8_2$ are formed, it is possible to obtain a high supporting rigidity. Moreover, because the balance shaft accommodating chamber 34 is integrally formed in one of the side walls of the upper block 31 and the lower block 32, the engine does not have to be enlarged.

These two balance shafts $8_1$, $8_2$ are connected to the crankshaft 5 for transmission of the rotational force of the crankshaft 5 thereto via a silent chain and a sprocket 39 provided at one end of the lower balance shaft $8_2$ and are driven to rotate at twice the rotational speed of the crankshaft 5 in opposite directions through mesh engagement of gears $41_1$, $41_2$ having the same number of teeth and securely fitted on the two balance shafts $8_1$, $8_2$ axially inwardly of the sprocket 39.

Third weights 40₁, 40₂ are provided on the ends of the respective balance shafts 8₁, 8₂ which have inertia forces for offsetting the residual secondary couple of the valve systems in such a manner directions in which the inertia forces are applied to become inverted phases.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

As has been described heretofore, according to the present invention, because there is no need to provide an exclusive balancing device for canceling out unbalanced vibrations generated by the residual secondary inertia force of the valve systems, the vibration control effects on the engine can be improved through a simple construction without increasing the number of components.

In addition, according to the present invention, on top of that, because the configuration of the eccentric weight is maintained uncomplicated, the production of balance shafts can be made easy.

Furthermore, according to the present invention, because the weights generating the third inertia forces are provided on the most extreme ends of the balance shafts, the residual secondary couple of the valve systems can be cancelled out by suppressing the increase in weight of the eccentric weight itself. Thus, the present invention is largely advantageous in that the engine vibrations can be further reduced.

What is claimed is:

1. A balancing device for a four-cycle engine comprising:
   a common rotating member rotatable in accordance with the rotation of a crankshaft of said engine, said common rotating member comprising:
   a first rotating portion for generating a first inertia force which offsets a residual secondary inertia force caused by piston systems when said engine is driven; and
   a second rotating portion for generating a second inertia force which offsets a residual secondary inertia force from valve systems when said engine is driven.

2. The balancing device as set forth in claim 1, wherein said rotating member further comprises:
   a third portion, which is disposed at its end portion, for generating a third inertia force which offsets a residual secondary inertia couple caused by valve systems.

3. The balancing device as set forth in claim 1, wherein said four-cycle engine is a four-cycle V-type engine, said valve systems including first and second valve systems which are asymmetrically constructed in relation to each other, said first valve system is disposed in one of the banks, and said second valve system is disposed in the other of the banks.

4. The balancing device as set forth in claim 3, wherein said rotating member is provided with at least one weight having a center of gravity positioned in a direction of a vector sum of vectors of said first inertia force and second inertia force.

5. The balancing device as set forth in claim 4, wherein said rotating member is provided with a third rotating portion, which is disposed at its end portion, for generating a third inertia force which offsets a residual secondary inertia couple being caused by said first and second valve systems.

6. The balancing device as set forth in claim 3, wherein said first valve system disposed in one of said banks comprises:
   a valve resting mechanism for maintaining intake and exhaust valves of said valve systems in a valve closed state.

7. The balancing device as set forth in claim 3, wherein said first valve system disposed on said one of said banks comprises:
   a valve resting mechanism for creating a vacuum state within a combustion chamber by resting the operation of the valves when the piston is at top dead center.

8. The balancing device for a four-story engine as set forth in claim 1, wherein said rotating member is supported on crank bearing walls of said engine.

9. The balancing device as set forth in claim 1, wherein said four-cycle engine is a-four-cycle V-type eight-cylinder engine having a bank gap angle of 90 degrees, and wherein said common rotating member comprises:
   a first common rotating shaft rotated in a first direction in accordance with the rotation of said crank shaft and provided with a first rotating weight member for generating a part of said first inertia force and a part of said second inertia force; and
   a second common rotating shaft rotated in a second direction opposite said first common rotating shaft with a second rotating weight member for generating the remaining part of said first inertia force and the remaining part of said second inertia force.

10. The balancing device as set forth in claim 9, wherein said valve systems include first and second valve systems which are asymmetrically constructed in relation to each other, said first valve system is disposed in one of the banks, and said second valve system is disposed in the other of the banks.

11. The balancing device as set forth in claim 10, wherein each of said first and second weight members has a center of gravity positioned in a direction of a vector sum of vectors of said first inertia force and said second inertia force.

12. The balancing device as set forth in claim 9, wherein said fist rotating shaft is provided with a third weight member at its end portion for generating a part of a third inertia force which offsets a residual secondary inertia couple caused by said valve systems, and said second rotating shaft is provided with a fourth weight member at its end portion for generating the remaining part of said third inertia force.

13. The balancing device as set forth in claim 10, wherein said first rotating shaft is provided with a third weight member at its end portion for generating a part of a third inertia force which offsets a residual secondary inertia couple being caused by said valve systems, and said second rotating shaft is provided with a fourth weight member at its end portion for generating the remaining part of said third inertia force.

14. The balancing device as set forth in claim 10, wherein said first valve system comprises:
   a valve resting mechanism for maintaining intake and exhaust valves of said valve systems in a valve closed state.

15. The balancing device as set forth in claim 10, wherein said first valve system comprises:
   a valve resting mechanism for creating a vacuum state within a combustion chamber by resting the operation of the valves when the piston is at top dead center.

16. The balancing device as set forth in claim 9, wherein said first and second rotating shafts are supported on crank bearing walls.

* * * * *